Nov. 2, 1965   P. SADA   3,215,538
PROCESS FOR HEATING AND STERILIZING FOOD PRODUCTS PACKAGED
IN HERMETICALLY SEALED THIN WALLED CONTAINERS
Filed April 25, 1963   2 Sheets-Sheet 1

INVENTOR.
Pietro Sada
BY Wenderoth, Lind, and
Ponack. Attorneys

Nov. 2, 1965 P. SADA 3,215,538
PROCESS FOR HEATING AND STERILIZING FOOD PRODUCTS PACKAGED
IN HERMETICALLY SEALED THIN WALLED CONTAINERS
Filed April 25, 1963 2 Sheets-Sheet 2

INVENTOR.
Pietro Sada
BY Wenderoth, Lind, and
Ponack, Attorneys

United States Patent Office 3,215,538
Patented Nov. 2, 1965

3,215,538
PROCESS FOR HEATING AND STERILIZING FOOD PRODUCTS PACKAGED IN HERMETICALLY SEALED THIN WALLED CONTAINERS
Pietro Sada, Aprilia, Latina, Italy, assignor to Industrie Verwertungsprodukte Anstalt, Vaduz, Liechtenstein
Filed Apr. 25, 1963, Ser. No. 275,648
Claims priority, application Italy, Nov. 30, 1962, 23,473/62
1 Claim. (Cl. 99—214)

The present invention relates to a process for heating and sterilizing food products packaged in hermetically sealed thin walled containers. Also the device destined to carry out said process forms an integrating part of this invention.

At the present status of the art, the canned and sterilized food products are usually packaged in containers made of either tinned iron or aluminum or glass within which, in order to obtain a greater and quicker transmission of the heat, a great amount of water is present. Products having a pH higher than 4.5 must be submitted to temperatures of 120° C. during 30 or more minutes, according to the size of the containers, in order to obtain the inhibition to the reproduction of the bacterial spores. However, the tendency is always that to reduce to the minimum the permanence of the containers within the autoclaves in order not to alter to a greatest extent the organoleptic features of the product. In order to expedite the heat transmission, in certain autoclaves, the containers are caused to revolute about their either vertical or horizontal axes. Also continuous autoclaves exist for particular types of products and for large productions.

The containers inside said autoclaves are kept constantly under pressure so as to counteract the pressure originated inside the containers, which tends to swell said containers and could also cause the containers to explode. Although this is a particular precaution to be used when sterilized containers are cooled down under counterpressure, usually the containers are made of a strong and thick material, with a minimum surface with respect to the enclosed product. But the so embodied containers are usually also difficult to be open at the moment of their consumption. To render easy the opening operation allowing in the meantime the safe preservation of special foods it has been suggested of utilizing a light weight and easily handled material for embodying an easily opened container, for instance aluminum, and the very thin plastic material. The heat transmission, in order to avoid an extended permanence within the autoclave with harmful consequences for the contained product could occur in this case through the most possible wide surface, instead through a reduced surface as it presently occurs. However, two difficulties must be overcome: the first difficulty consisting in the closure and the second difficulty in the elasticity and resistance to pressure of a container made of a material few hundredths of a mm. thick. As far as the first problem is concerned the difficulty can be considered solved by the use of cements or collants or suitable packings, and these substances are mentioned in this instance since the minimum thickness allows no hermetic crimping; the second difficulty can be overcome by adopting an autoclave the features of which are suitable for the intended purpose.

The object of this invention is that of solving in a rational and effective way the above disclosed problems, embodying an autoclave suitable to carry out quickly the heating and sterilizing cycle under "optimum" conditions both as far as the preservation of the organoleptic features of the product packaged in thin wall containers is concerned and as far as the polymerization of the sealing packing, as necessary to said containers for a rigorous seal, if the case may be, is concerned.

This invention will be now described with reference to the attached drawings showing, by way of nonlimitative example, two preferred embodiments of the invention itself.

Figure 1:
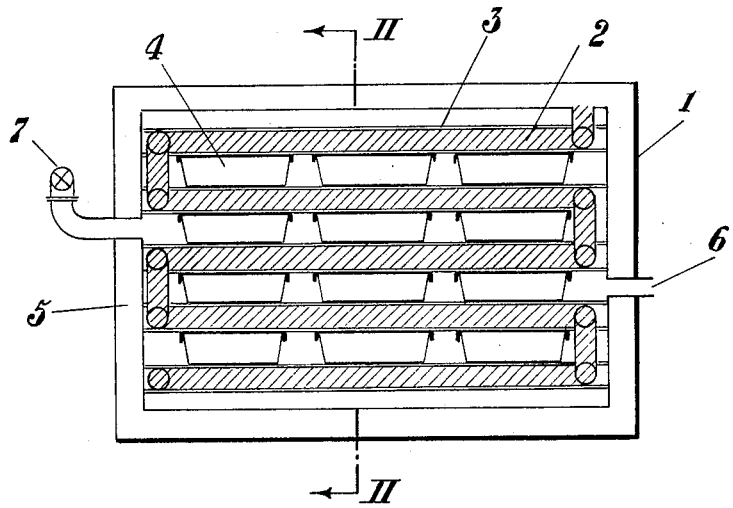
FIG. 1 is a cross sectional of the autoclave according to this invention, taken along the plane I—I of FIG. 2.
Figure 2:
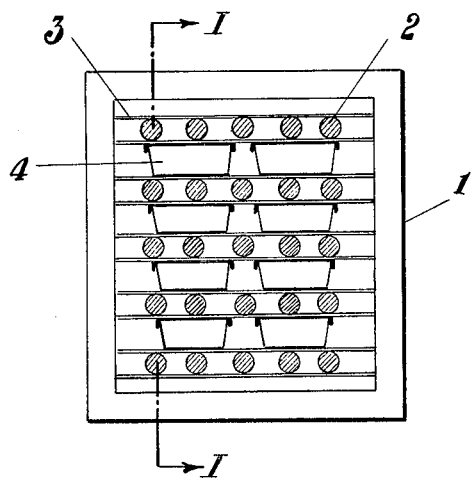
FIG. 2 is the cross sectional view taken along the plane II—II of FIG. 1.

With reference to FIGS. 1 and 2, this invention provides for a pressurized autoclave 1 thermally insulated, with a removal door through its front surface, wherein are located systems of horizontal ducts 2 made preferably of copper, confined between movable shelves 3 in order to allow the easy introduction and removal of the containers, the closed containers 4 to be sterilized being located between said surface contacting same. The coils formed by said ducts through which, as heat source, flows steam or other high temperature fluid, heating the metal shelves 3, allow a uniform heat transmission, or a uniform heat absorption as quick as possible by the containers 4 which are thus substantially heated by contact from their flat cover and bottom surfaces. Said coils could be replaced by plates also electrically heated. The heat transmission, in order to expedite as much as possible the sterilizing process could be effected also partially by irradiation, if a double bottom 5 is provided for the autoclave, connected to the coil units. The double bottom could be suitably replaced by a coil system lining the inside of the autoclave, also connected to the horizontal contact systems. The inner pressure of the thin walled containers, originated by the heat imparted to the contents, is counteracted by the inlet of compressed air into the autoclave from outside, by means of the duct 6 up to equilibrium. Depending upon the needs, it is possible to admit inside the autoclave either steam or water besides the coils. There is also provided the possibility of creating a temporary vacuum in order to render easy the admission of noble or inert gas acting as catalysts for the polymerization of these substances used for obtaining the hermetic seal of the containers. When the sterilizing stage is terminated, the conditions of said stage being determined according to the product to be preserved and also upon the particular shape of the container tending to distribute the contents in a minimum thickness through a wide surface, said stage being anyway reduced to a minimum duration with evident advantages, the containers are quickly cooled down by contact, by means of refrigerating liquid which is caused to flow in the coil system 2. As the containers yield their heat, the autoclave is de-pressurized, either by an outer control 7 or by suitable automatic controls, so as to leave unaltered the equilibrium conditions between the inner pressure of the containers and the pressure within the autoclave. When the equilibrium has been obtained with the outer pressure and when a sufficiently low temperature of the containers has been reached whereby no possibility of a further cooking of the product will occur, with a consequent swelling of the container, the autoclave is opened and the rest surfaces 3 with the sterilized containers are removed.

Figure 3:
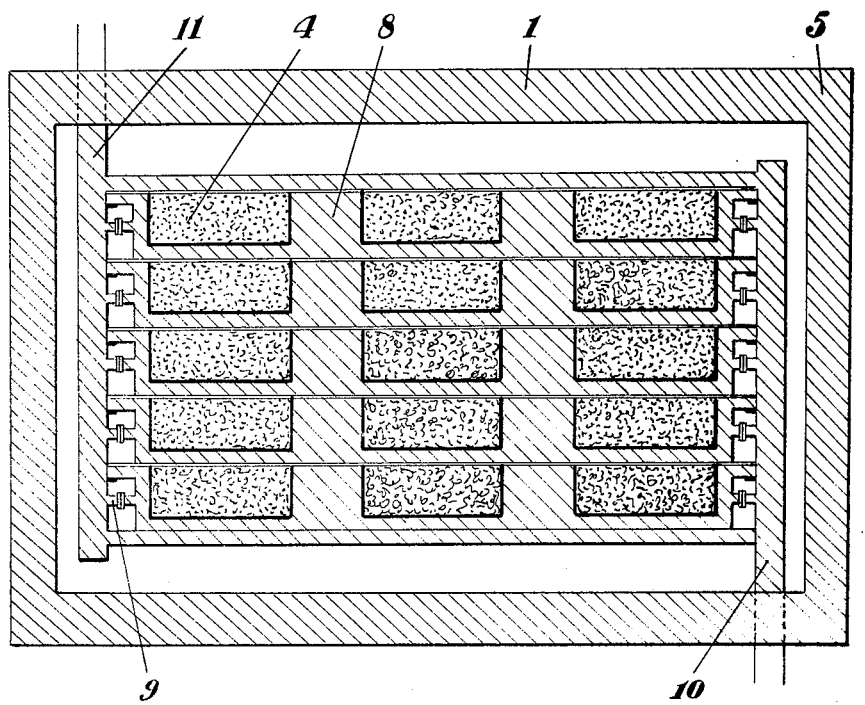
FIG. 3 shows a second embodiment of the autoclave, in cross sectional view.

In FIG. 3 a second embodiment of the invention has been shown. In this case, the containers 4 are located within recesses provided in metal plates 8 which are internally hollow and into which is delivered in a controlled way the fluid forming the heat source and destined to uniformly heat the containers. The heat transmission, as necessary for the sterilization occurs thus by contact throughout the surfaces of the containers.

Figure 4:
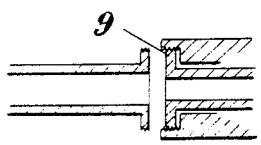
FIG. 4 shows a detail of FIG. 3.

The removable hollow plates 8 (FIG. 4) are connected by means of the connecting pipes 9, provided with quick couplings, to the manifolds 10 and 11 leading to the fluid source.

The present invention has been illustrated and described in two preferred embodiments, being, however, understood that constructive changes might be practically adopted without departing from the scope of the present industrial privilege.

I claim:

A process for sterilizing food products packaged within hermetically sealed thin walled containers of sheet metal, comprising heating said containers in an autoclave by contacting the containers with heat radiant means supplied with a hot fluid, simultaneously increasing the pressure within the autoclave by a pressurized fluid to balance increase of pressure within said containers, keeping the hot fluid at sterilizing temperature and the pressurized fluid within the autoclave at a corresponding pressure for a period of time sufficient to sterilize the contents of said containers, refrigerating the sterilized containers by supplying said heat radiant means with a cold fluid and gradually discharging the pressurized fluid to balance the decrease of the pressure within said containers, whereby the heating and refrigerating stages are performed to avoid the heating and refrigerating fluid from mixing with the pressurized fluid, thus preventing the formation of any condensate.

References Cited by the Examiner

UNITED STATES PATENTS

| | | | |
|---|---|---|---|
| 1,162,808 | 12/15 | Robinson | 99—359 |
| 1,961,681 | 6/34 | Bohart | 99—214 |
| 2,174,659 | 10/39 | Heuser | 99—214 |
| 2,389,117 | 11/45 | Bensel | 99—359 |
| 2,398,082 | 4/46 | Cavallito | 99—214 X |
| 2,710,260 | 6/55 | Reed | 99—214 |
| 3,052,559 | 9/62 | Peebles | 99—214 |
| 3,071,478 | 1/63 | Cheftel et al. | 99—214 |

HYMAN LORD, *Primary Examiner.*

RAYMOND N. JONES, A. LOUIS MONACELL,
*Examiners.*